United States Patent Office 3,154,348
Patented Oct. 27, 1964

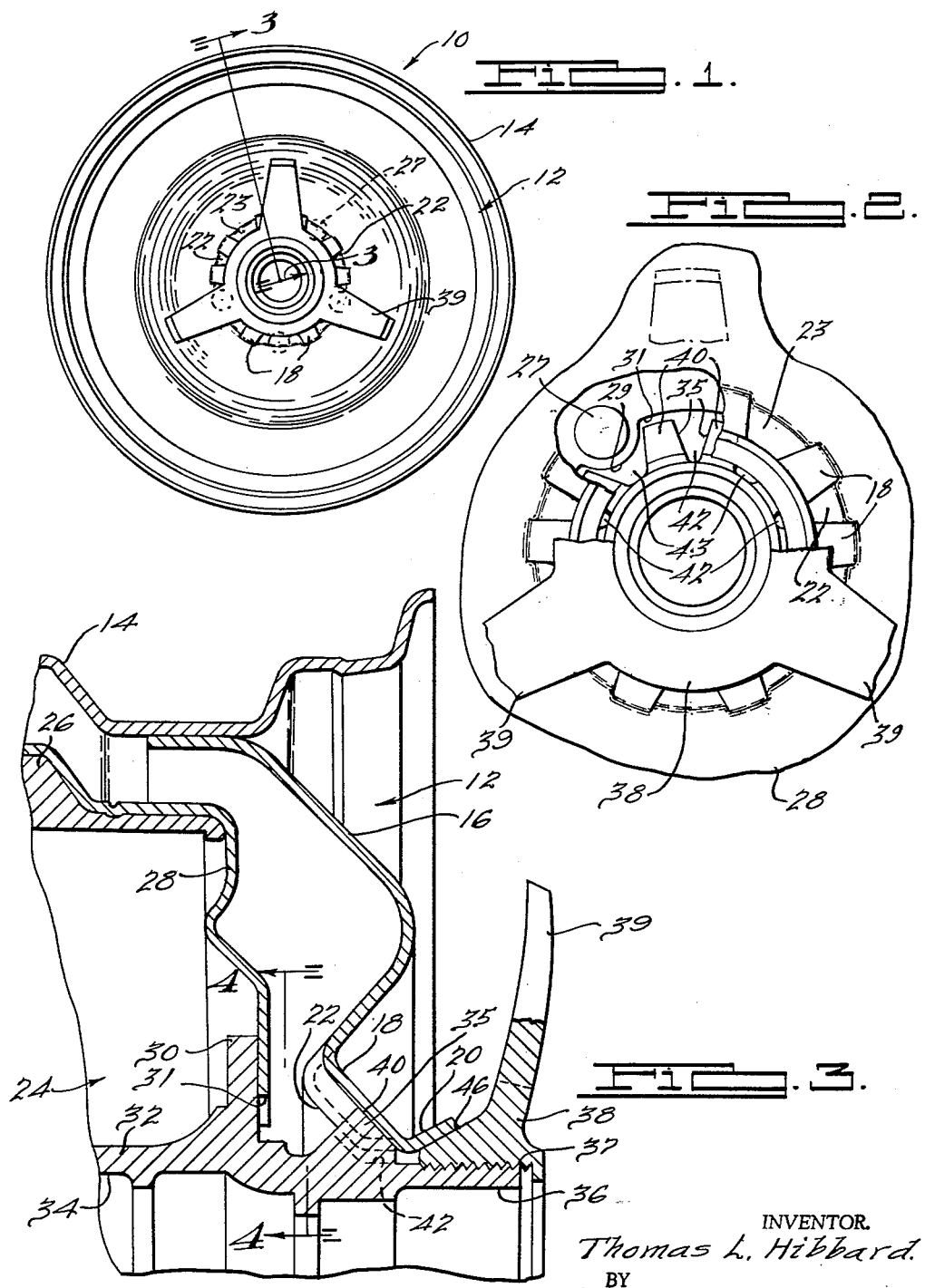

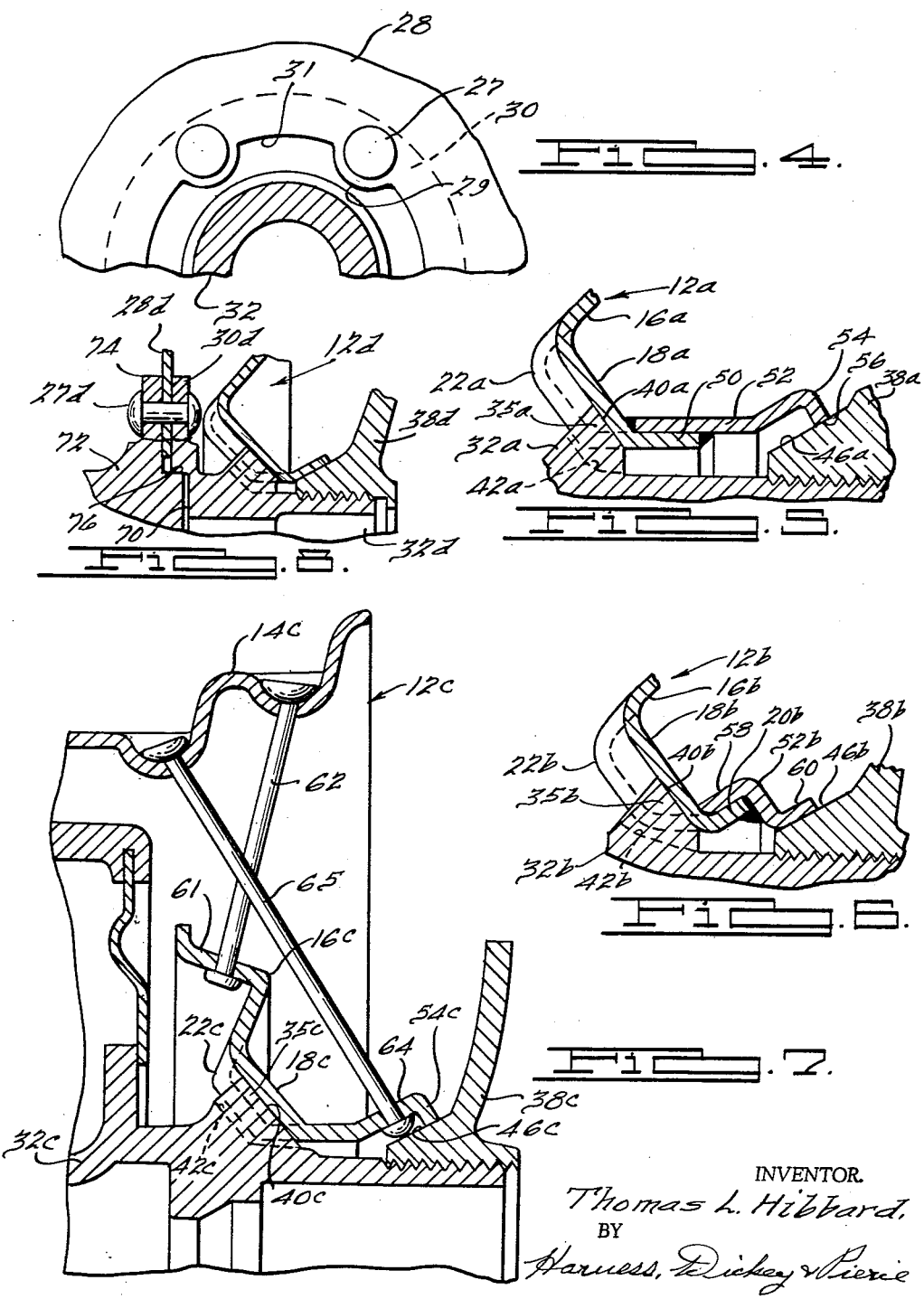

3,154,348
WHEEL STRUCTURE
Thomas L. Hibbard, Birmingham, Mich., assignor to Kelsey-Hayes Company, Romulus, Mich., a corporation of Delaware
Filed Aug. 1, 1962, Ser. No. 214,127
13 Claims. (Cl. 301—6)

This invention relates to wheels and particularly to a wheel assembly mountable upon a central hub of an automotive vehicle.

It is conventional in the automotive industry to mount wheels onto a brake drum either by means of a plurality of studs secured to and extending axially outwardly from the brake drum or by means of a plurality of bolts threadable within a plurality of axially extending, threaded bores radially disposed in the brake drum. Thus, in accordance with conventional wheel constructions, in order to remove a wheel, five or six nuts or bolts must be first removed from the corresponding studs on or threaded bores in the brake drum. It is an object of the present invention to provide a wheel mounting structure for an automotive vehicle wheel in which the wheel may be removed and installed on the vehicle simply by the removal and application of a single large central nut threaded onto a hub.

It is another object of the present invention to provide a wheel assembly of the above character in which the wheel is accurately located on the hub and is positively restrained from rotation relative to the hub.

Still another object of the present invention is to provide a wheel assembly of the above described type which is strong and rugged, which is convenient to use, which is inexpensive to manufacture, and which is reliable in operation.

Other objects, features, and advantages of the present invention will become apparent from the subsequent description and the appended claims, taken in conjunction with the accompanying drawings, in which:

FIGURE 1 is a front elevational view of a wheel assembly embodying the features of the present invention;

FIGURE 2 is an enlarged fragmentary front elevational view, with some parts broken away, depicting the central portion of the wheel assembly shown in FIGURE 1;

FIGURE 3 is an enlarged fragmentary sectional view of the assembly shown in FIGURE 1 and taken substantially along the line 3—3 in FIGURE 1;

FIGURE 4 is a fragmentary view of the structure shown in FIGURE 3 taken substantially along the line 4—4 in FIGURE 3;

FIGURE 5 is a fragmentary sectional view, similar to the view of FIGURE 3, depicting a modified wheel assembly construction;

FIGURE 6 is a fragmentary sectional view, similar to the view of FIGURE 3, depicting another modification of the wheel assembly;

FIGURE 7 is a fragmentary sectional view, similar to the view of FIGURE 3, depicting still another construction of the wheel assembly; and FIGURE 8 is a fragmentary sectional view, similar to the view of FIGURE 3, depicting a wheel structure embodying the features of this invention as applied to a rear wheel.

As previously mentioned, with conventional wheel assembly constructions, the removal of a wheel requires the removal of a plurality of bolts or nuts; many sports car enthusiasts, stock car racers, and other car owners, in order to reduce the amount of time required to change wheels, utilize a wheel mounting assembly in which the removal or installation of the wheel requires only the removal or application of a single large "spinner" nut. However, "spinner" nut wheel assembly structures which have heretofore been available require the use of specially cast wheels made from magnesium alloys or the like, to keep the weight of the cast wheels reasonable, and are thus extremely expensive. With the wheel assembly of the present invention, a minimum number of components formed by conventional methods, i.e., stamping, etc., and using conventional materials, i.e., sheet steel, are utilized, resulting in a lighter, less expensive wheel assembly. Another advantage of the wheel assembly of the present invention is that a separate adapter member is not required in securing the wheel to the hub.

Looking now to FIGURE 1, a front wheel assembly, for an automotive vehicle, embodying the features of this invention is generally indicated by the numeral 10 and has a wheel member 12 having a radially extending peripheral rim section 14 of a conventional structure for receiving a tire (not shown), which is welded or otherwise secured to the radially outer edge of a central body or flange section 16. The rim section 14 and the body section 16 can be made of steel and formed in accordance with conventional production techniques. The body 16 is generally of an irregular shape and terminates at its radially inner end in a frusto conically shaped, axially outwardly extending, radially inwardly tapering portion 18 which in turn is integral with a frusto conically shaped, oppositely tapering flange 20. The frusto conically shaped portion 18 has a plurality of circumferentially spaced, radially inwardly extending indentations or corrugations 22 and 23 which serve a purpose to be presently seen. The corrugations 22 and 23 are alternately circumferentially disposed with corrugations 23 being circumferentially longer than corrugations 22.

The wheel 12 is adapted to be mounted upon a brake drum and hub assembly 24 which has a brake drum member 26 and a hub member 32. The brake drum member 26 has a generally radially extending center portion 28 at one end, which is secured at its radially innermost edge by welding, riveting or otherwise to a radially outwardly extending annular flange portion 30 of the hub member 32. In the embodiment of FIGURES 1–4 the drum member 26 has its center portion riveted by rivets 27 to the flange portion 30. The hub member 32 is hollow and has a counterbore 34 at its axially inner or inboard end for receiving a bearing (not shown) disposed at the axially innermost end of a spindle of a steering knuckle (not shown) and has at its axially outermost or outboard end a counterbore 36 for receiving a bearing (not shown) to be disposed about the outer end of that spindle. The hub member 32 terminates at its outboard end in an externally threaded portion 37 for threadably receiving a large spinner nut member 38 which has a plurality of radially outwardly extending arms 39 which facilitate gripping of the nut 38 for its application upon and removal from the threaded portion 37 of the hub member 32. Annularly disposed intermediate the flange 30 and the threaded portion 37 are pairs of radially outwardly extending teeth 35 each having outer surfaces 40 which define a frusto conical shape of a generally tapered contour similar to the general contour of the frusto conically shaped portion 18 of the body section 16 of the wheel 12. Each tooth 35 is circumferentially spaced from its mate by a relatively short slot 42 with, for a purpose to be seen, successive pairs of teeth 35 being circumferentially spaced by a relatively long slot 43. While the projections 22 and 23 and teeth 35, and hence slots 42 and 43, extend axially as well as radially, they have, for the sake of simplicity and convenience, been described as extending radially.

The slots 42 and 43 are annularly distributed in the same manner as corrugations 22 and 23, respectively, of the wheel member 12 such that, as the wheel 12 is moved axially inwardly over the hub section 32 and as the portion 18 engages the surfaces 40, the projections 22 and 23 are matably disposed within the slots 42 and 43, respectively. While at this time the wheel 12 can be moved axially relative to the hub section 32, the mating relationship between the corrugations or projections 22, 23 and the slots 42, 43, respectively, prevent relative rotation between the wheel 12 and the hub 32.

The radially inner end of the center or brake back portion 28 terminates in a scalloped construction as defined by alternate ridges 29 and grooves 31 (FIGURE 4). Each of the grooves 31 is of a preselected circumferential length and is indexed circumferentially relative to the other grooves such that the brake back portion can be moved axially over the hub section 32 with each of the grooves 31 moving over one pair of the teeth 35, and with the ridges 29 moving through the large slots 43. In assembly, then, the brake back portion 28 can be riveted to the flange 30 of the hub section 32 at each of the ridges 29. It can be appreciated that, if such a scalloped construction were not utilized, the center aperture of the brake back up portion 28 would have to be enlarged to allow the portion 28 to be moved axially past the teeth 35; this in turn would require that the flange 30 be increased in diameter to allow the brake back up portion 28 to be riveted thereto, thus increasing the cost of the wheel assembly.

The spinner nut 38 terminates on its axially inner side in a frusto conically shaped shoulder 46 which is of a tapered contour similar to that of the tapered flange 20 of the body section 16 of the wheel 12. Thus, as the spinner nut 38 is threaded on the threaded portion 37 of the hub section 32 and is moved axially inwardly, the tapered shoulder 46 is moved into engagement with the tapered flange 20, thus moving the wheel 12 axially inwardly and securely seating the tapered portion 18 of the wheel 12 against the tapered portion 40 of the hub section 32. As the spinner nut 38 is tightened, the wheel 12 is further tightened between the hub section 32 and the spinner nut 38. As previously noted, the engagement of the projections or corrugations 22, 23 within the slots 42, 43 rotatively locks the wheel 12 and the hub section 32 together. Thus a simple construction has been provided whereby a wheel formed by conventional techniques can be applied to and removed from the hub simply by the application of a single, large spinner nut.

FIGURES 5–7 depict modifications of the design of the wheel assembly as previously described and in the following description of these modifications similar components having similar functions are given the same numbers with the addition of a letter subscript. Thus, looking to the modified construction in FIGURE 5, the body section 16a of a wheel 12a has a frusto conically shaped portion 18a which is engageable with frusto conically shaped surface portion 40a on annularly disposed teeth 35a of the hub section 32a and terminates at its radially innermost end in an annular flange 50. Welded or otherwise secured to the annular flange 50 is an annular body member 52 which is disposed coaxially over the annular flange portion 50. The body member 52 terminates at its axially outer end in a radially inwardly extending flange portion 54 which defines at its radially innermost edge 56 a frusto conically shaped surface similar in shape to the shoulder 46a of the spinner nut 38a. Thus, in the construction as shown in FIGURE 5, as the spinner nut 38a is moved axially inwardly, the tapered shoulder 46a thereof engages the edge 56 of the flange portion 54 moving the wheel 12a axially inwardly such as to move the frusto conically shaped portion 18a into engagement with the tapered surface portions 40a of the wheel hub 32a, thereby axially retaining the wheel 12a to the hub 32a. The wheel 12a is maintained from rotation relative to the hub 32a by the engagement of corrugations or projections 22a and slots 42a similarly as described in conjunction with the embodiment shown in FIGURES 1–4. While the body 52 is shown to be a separate member which is welded or otherwise secured to the flange 50, a similar construction could be made with the body member 52 integral with the wheel 12a.

Looking now to FIGURE 6, the body section 16b of the wheel 12b terminates at its radially innermost end in an axially outwardly extending, radially outwardly tapering flange 20b. An annular body member 52b has a generally Z-shaped cross section with an axially inwardly extending tapered leg 58 disposable in overlapping relationship relative to the flange 20b and with an axially outwardly extending tapered leg portion 60 which is similar in contour to and matable with the tapered shoulder 46b of the spinner nut 38b. The annularly extending body member 52b can be made of a split construction to facilitate assembly over the tapered flange 20b and can be welded or otherwise secured thereto. Similar to the construction of FIGURES 1–4, the body section 16b has a frusto conical portion 18b matably engageable with a similarly tapered surface portion 40b on the hub 32b. Relative rotation between wheel 12b and hub 32b is prevented by the engagement of projections 22b on portions 18b and slots 42b between the teeth 35b.

In the concept of FIGURE 7, an embodiment is shown for a wire wheel 12c having an outer annular rim section 14c which is secured to an inner, annularly extending, and partially concentrically disposed body section 16c. The inner body section 16c terminates at its axially inner and radially outer end in a radial flange 61 which is secured at a plurality of locations to the rim 14c by means of a plurality of radially extending spokes 62. The body section 16c has at its radially inner and axially outer end an annular, radially outwardly extending ring portion 64 which is secured at a plurality of locations to an axially inner section of the rim 14c by means of a second plurality of spokes 65. The body section 16c has disposed axially intermediate its ends a frusto conical portion 18c which is matable with similarly contoured tapered surface portions 40c on teeth 35c of a wheel hub section 32c. The body section 16c and hence the wheel 12c is prevented from rotation relative to the hub section 32c by means of the engagement of a plurality of corrugations or projections 22c on tapered portion 18c with a plurality of slots 42c between the teeth 35c of the hub section 32c. The ring portion 64 is integral with a radially inwardly extending flange 54c which defines at its radially innermost edge 56c a frusto conically shaped surface similar to the surface defined by the tapered shoulder 46c of the spinner nut 38c. Thus, as the spinner nut 38c is moved axially relative to the hub 32c, the axial force applied to the flange 54c via the tapered shoulder 46c moves the wheel 12c axially inwardly, moving the tapered portion 18c into engagement with the tapered surface portions 40c of the hub section 42c, thereby tightly axially securing the wheel 12c to the hub section 32c.

The embodiments of FIGURES 5, 6 and 7 are similar to the embodiment of FIGURES 1–4 as to the provision of long slots and corrugations (similar to slots 43 and projections 23) and in the construction of the brake back (similar to brake back 28) with grooves and ridges (similar to grooves 31 and ridges 29) to provide the constructional advantages previously mentioned in the discussion of the latter embodiment.

FIGURE 8 depicts a modification of the design of FIGURES 1 through 4, as adapted for the rear or driven wheels of a vehicle, and in the following description similar components having similar functions are given the same numbers with the addition of a letter subscript. Thus in looking to FIGURE 8, the wheel 12d, spinner nut 38d and the outboard portion of the hub section 32d are similar in function and operation to the corresponding wheel 12, spinner nut 38 and outboard portion of the hub section 32d of FIGURES 1–4. The hub section 32d terminates in a radially, outwardly extending annular flange 30d which is substantially concentric with a counterbore 70 located in the rear face of the hub section 32d. A rear axle 72 terminates at its outboard end in a radially, outwardly extending flange 74. The axle 72 terminates in an annular, axially outwardly extending pilot boss 76 which is matably receivable within the counterbore 70 in the rear face of the hub section 32d. The brake back plate 28d of the brake drum is sandwiched between the flanges 30d and 74 of the hub section 32d and rear axle 72, respectively. The hub section 32d, rear axle 72 and the brake back plate 28d are secured together by a plurality of circumferentially disposed rivets 27d extending through the flanges 30d and 74 and through the radially inner portion of the back plate 28d. Thus in the embodiment shown in FIGURE 8, a construction has been shown wherein the advantages of the wheel construction as shown in FIGURES 1 through 4 can be realized on the rear wheels of a vehicle. It can be appreciated that the modifications shown in FIGURES 5, 6 and 7 can similarly be adapted for use on rear wheels.

In all the constructions as shown and described above, it can be appreciated that the wheel can be very simply and readily removed merely by the removal of a single large spinner nut. It can also be seen that in the embodiments as shown the wheel and the hub are rotatively locked together. By the use of matable, tapered surfaces to axially retain the wheel to the hub, slight variations in production tolerances or any slight dimensional variations due to wear will be automatically compensated since the wheel will be moved axially inwardly until the associated tapered surfaces on the hub and wheel are tightly and securely engaged.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A wheel assembly comprising a hub member having a annular flange and an axially outwardly extending, radially inwardly tapering, frusto conical portion intermediate said annular flange and one end of a wheel member mountable on said hub member and having an annular portion tapered for matable engagement with said portion of said hub member, said portion of said wheel member having a plurality of radially extending projections matably engageable within a plurality of slots defining teeth in said portion of said hub member, a brake drum section having a radially outwardly extending brake back portion terminating at its radially inner end in an opening of a minimum diameter less than the outermost diameter of said frusto conical portion with said opening having a plurality of ridges and grooves circumferentially disposed in a manner oppositely to said slots in said portion of said hub member whereby said ridges can be moved axially through said slots and said grooves past said teeth between said slots, means securing said brake back to said flange of said hub at said ridges, and a spinner nut removably disposed on one end of said hub member and engageable with said wheel member for urging said wheel member in said one axial direction as said spinner nut is moved along said hub in said one axial direction.

2. A wheel assembly comprising a hub member having an annular flange and an axially outwardly extending, radially inwardly tapering, frusto conical portion intermediate said annular flange and one end, a wheel member mountable on said hub member and having an annular portion tapered for matable engagement with said portion on said hub member and terminating at its radially inner end in an axially outwardly extending, radially outwardly tapering, frusto conically shaped flange, said portion of said wheel member having a plurality of radially extending projections matably engageable within a plurality of slots defining teeth in said portion of said hub member, a brake drum section having a radially outwardly extending brake back portion terminating at its radially inner end in an opening of a minimum diameter less than the outermost diameter of said frusto conical portion with said opening having a plurality of ridges and grooves circumferentially disposed in a manner oppositely to said slots in said portion of said hub member whereby said ridges can be moved axially through said slots and said grooves past said teeth between said slots, means securing said brake back to said flange of said hub at said ridges, a spinner nut removably disposed on one end of said hub member and having an annular tapered shoulder matably engageable with said tapered flange on said wheel member for urging said wheel member in said one axial direction as said spinner nut is moved along said hub in said one axial direction.

3. A wheel assembly for a wheeled vehicle comprising a hub member, a wheel member mountable on said hub member and having a central body section comprised of a lightweight metal stamping of a substantially uniform thickness having at its radially inner end a flange terminating in an edge defining an axially outwardly extending, radially outwardly tapering frusto conical surface, stop means on said hub member and said wheel member for restricting axial movement of said wheel member relative to said hub member in a direction inboard of the vehicle, said stop means comprising an axially outwardly extending, radially inwardly tapering, annular frusto conical portion located on said hub member intermediate its ends and an annular portion on said central body section tapered for matable engagement with said portion on said hub member, lock means on said hub member and said wheel member for rotatably locking said hub member and said wheel member together, and a spinner nut removably disposed on the outboard end of said hub member and having an annular, tapered shoulder matably engageable with said surface of said edge of said flange of said wheel member for urging said wheel member in said inboard direction as said spinner nut is moved along said hub member in said inboard direction, said wheel member being completely radially supported on said annular portion on said hub and on said tapered shoulder on said spinner nut.

4. A wheel assembly for a wheeled vehicle comprising a hub member, a wheel member mountable on said hub member and having a central body section comprised of a one-piece lightweight metal stamping of a substantially uniform thickness with a frusto conically shaped flange, stop means on said hub member and said central body section for restricting axial movement of said wheel member relative to said hub member in a direction inboard of the vehicle, said stop means comprising a radially outwardly extending, annular frusto conical portion located on said hub member intermediate its ends and an annular portion on said central body section tapered for matable engagement with said portion on said hub member, lock means on said hub member and said central body section for rotatably locking said hub member and said wheel member together, said lock means comprising a plurality of radially extending projections in said portion in said central body section with said projections being circumferentially separated by sections of said portion of said central body section and a plurality of slots in said portion of said hub member adapted to receive said projections, and a spinner nut removably disposed on the outboard end of said hub member and having an annular, tapered shoulder matably engageable with said frusto conically shaped flange on said central body section for urging said wheel member in said inboard direction as said spinner nut is moved along said hub member in said inboard direction, said wheel member being completely radially supported by said central body section on said annular portion on said hub and on said tapered shoulder on said spinner nut.

5. The wheel assembly of claim 4 with selected ones of said slots extending circumferentially a preselected greater distance than the others of said slots and further including a brake drum having a radially outwardly extending brake back portion terminating at its radially inner end in an opening of a minimum diameter less than the outermost diameter of said frusto conical portion with said opening having a plurality of ridges and grooves circumferentially disposed in a manner oppositely to said slots in said portion of said hub member whereby said ridges can be moved axially through said slots and said grooves past the sections between said slots, an annular flange on the inboard side of said hub member, and means fastening said brake drum to said flange of said hub member.

6. A wheel assembly for a wheeled vehicle comprising a hub member having an annular flange at one end, a wheel member mountable on said hub member and having a frusto conically shaped flange, stop means on said hub member and said wheel member for restricting axial movement of said wheel member relative to said hub member in one axial direction, said stop means comprising a radially outwardly extending, annular frusto conical portion located on said hub member intermediate its ends and an annular portion on said wheel member tapered for matable engagement with said portion on said hub member, lock means on said hub member and said wheel member for rotatably locking said hub member and said wheel member together, said lock means comprising a plurality of radially extending projections in said portion in said wheel member and a plurality of slots in said portion of said hub member with said slots adapted to receive said projections, selected ones of said slots extending circumferentially a preselected greater distance than the others of said slots, a brake drum having a radially outwardly extending brake back portion, means located in axial alignment with said selected ones of said slots for securing said brake drum at said brake back portion to said annular flange on said hub member, and a spinner nut removably disposed on the end of said hub member opposite said annular flange and having an annular, tapered shoulder matably engageable with said tapered flange on said wheel member for urging said wheel member in said one axial direction as said spinner nut is moved along said hub member in said one axial direction.

7. A wheel assembly for a wheeled vehicle comprising a hub member, a wheel member mountable on said hub member and having a central body section comprised of a one-piece lightweight metal stamping of a substantially uniform thickness terminating in an annular flange, an annular body member of a lightweight metal stamping of a substantially uniform thickness fixedly secured in overlapping relationship to said annular flange and having a flange portion terminating in an edge defining an axially outwardly extending, radially outwardly tapering, frusto conical surface, stop means on said hub member and said central body section for restricting axial movement of said wheel member relative to said hub member in a direction inboard of the vehicle, said stop means comprising a radially outwardly extending, annular frusto conical portion located on said hub member intermediate its ends and an annular portion on said central body section tapered for matable engagement with said portion on said hub member, lock means on said hub member and said central body section for rotatably locking said hub member and said wheel member together, said lock means comprising a plurality of radially extending projections in said portion in said central body section with said projections being circumferentially separated by sections of said portion of said central body section and a plurality of slots in said portion of said hub member adapted to receive said projections, and a spinner nut removably disposed on the outboard end of said hub member and having an annular, tapered shoulder matably engageable with said surface of said edge of said body member for urging said wheel member in said inboard direction as said spinner nut is moved along said hub member in said inboard direction, said wheel member being completely radially supported by said central body section on said annular portion on said hub and on said tapered shoulder on said spinner nut.

8. A wheel assembly for a wheeled vehicle comprising: a hub member, a wheel member mountable on said hub member and having a central body section comprised of a one-piece lightweight metal stamping of a substantially uniform thickness terminating in an annular flange, an annular body member of a lightweight metal stamping of a substatnially uniform thickness fixedly secured in overlapping relationship to said annular flange and terminating in an axially outwardly extending, radially outwardly tapering, frusto conically shaped flange, stop means on said hub member and said central body section for restricting axial movement of said wheel member relative to said hub member in a direction inboard of the vehicle, said stop means comprising a radially outwardly extending, annular frusto conical portion located on said hub member intermediate its ends and an annular portion on said central body section tapered for matable engagement with said portion on said hub member, lock means on said hub member and said central body section for rotatably locking said hub member and said wheel member together, said lock means comprising a plurality of radially extending projections in said portion in said central body section with said projections being circumferentially separated by sections of said portion of said central body section and a plurality of slots in said portion of said hub member adapted to receive said projections, and a spinner nut removably disposed on the outboard end of said hub member and having an annular, tapered shoulder matably engageable with said frusto conically shaped flange on said body member for urging said wheel member in said inboard direction as said spinner nut is moved along said hub member in said inboard direction, said wheel member being completely radially supported by said central body section on said annular portion on said hub and on said tapered shoulder on said spinner nut.

9. The combination of claim 4 with said wheel assembly adapted to be driven by an axle shaft and including flange means for securing said hub member to the axle shaft.

10. The combination of claim 9 with said wheel assembly adapted to be driven by an axle shaft and including flange means for securing said hub member to the axle shaft.

11. The combination of claim 10 further including a brake drum having an annular brake back and with said last named means securing said brake back and said annular flange of said hub to the flange of the axle shaft.

12. A wheel assembly for a wheeled vehicle comprising: a hub member, a wire wheel member mounted on said hub member and having an outer annular rim section connected to an annular central body section by a plurality of radially extending spokes, said central body section comprised of a one-piece lightweight metal stamping of a substantially uniform thickness with a frusto conically shaped flange, stop means on said hub member and said central body section for restricting axial movement of said wheel member relative to said hub member in a direction inboard of the vehicle, said stop means comprising a radially outwardly extending, annular frusto conical portion located on said hub member intermediate its ends and an annular portion on said central body section tapered for matable engagement with said portion on said hub member, lock means on said hub member and said central body section for rotatably locking said hub member and said wheel member together, said lock means comprising a plurality of radially extending projections in said portion in said central body section with said projections being circumferentially separated by sections of said portion of said central body section and a plurality of slots in said portion of said hub member adapted to receive said projections, and a spinner nut removably disposed on the outboard end of said hub member and having an annular, tapered shoulder matably engageable with said frusto conically shaped flange on said central body section for urging said wheel member in said inboard direction as said spinner nut is moved along said hub member in said inboard direction, said wheel member being completely radially supported by said central body section on said annular portion on said hub and on said tapered shoulder on said spinner nut.

13. A wheel assembly for a wheeled vehicle comprising: a hub member, a wire wheel member mountable on said hub member and having an outer annular rim section connected to an annular central body section by a plurality of radially extending spokes, said central body section comprised of a one-piece lightweight metal stamping of a substantially uniform thickness terminating at its radially inner end in a flange terminating in an edge defining an axially outwardly extending, radially outwardly tapering frusto conical surface, stop means on said hub member and said central body section for restricting axial movement of said wheel member relative to said hub member in a direction inboard of the vehicle, said stop means comprising a radially outwardly extending, annular frusto conical portion located on said hub member intermediate its ends and an annular portion on said central body section tapered for matable engagement with said portion on said hub member, lock means on said hub member and said central body section for rotatably locking said hub member and said wheel member together, said lock means comprising a plurality of radially extending projections in said portion in said central body section with said projections being circumferentially separated by sections of said portion of said central body section and a plurality of slots in said portion of said hub member adapted to receive said projections, and a spinner nut removably disposed on the outboard end of said hub member and having an annular, tapered shoulder matably engageable with said surface of said edge of said flange on said central body section for urging said wheel member in said inboard direction as said spinner nut is moved along said hub member in said inboard direction, said wheel member being completely radially supported by said central body section on said annular portion on said hub and on said tapered shoulder on said spinner nut.

References Cited in the file of this patent

UNITED STATES PATENTS

| | | |
|---|---|---|
| 1,424,211 | Pugh | Aug. 1, 1922 |
| 1,901,078 | Bourdon | Mar. 14, 1933 |
| 1,972,251 | Udale | Sept. 4, 1934 |
| 2,066,233 | Sinclair | Dec. 29, 1936 |
| 2,085,294 | Campbell | June 29, 1937 |

FOREIGN PATENTS

| | | |
|---|---|---|
| 453,282 | France | Mar. 31, 1913 |
| 1,133,321 | France | Nov. 19, 1956 |
| 411,445 | Great Britain | June 5, 1934 |
| 470,655 | Great Britain | Aug. 19, 1937 |